Figure 1:
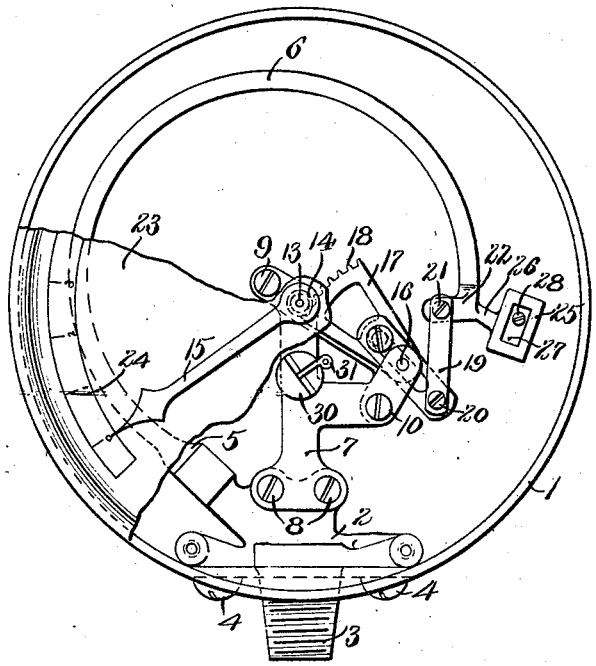

March 4, 1924.

O. W. HEISE 1,485,412

PROTECTING DEVICE FOR GAUGES

Filed Feb. 25, 1922

Inventor:
Otto W. Heise,
by Roberts, Roberts & Cushman
Attys.

Patented Mar. 4, 1924.

1,485,412

UNITED STATES PATENT OFFICE.

OTTO W. HEISE, OF BRIDGEPORT, CONNECTICUT, ASSIGNOR TO MANNING, MAXWELL & MOORE, INC., OF NEW YORK, N. Y., A CORPORATION OF NEW JERSEY.

PROTECTING DEVICE FOR GAUGES.

Application filed February 25, 1922. Serial No. 539,256.

*To all whom it may concern:*

Be it known that I, OTTO W. HEISE, a citizen of the United States of America, and resident of Bridgeport, in the county of Fairfield and State of Connecticut, have invented new and useful Improvements in Protecting Devices for Gauges, of which the following is a specification.

This invention concerns pressure gauges and relates more particularly to devices whereby the delicate parts of the gauge mechanism may be guarded against injury or displacement as the result of shocks or blows to which the gauge may be subjected during transportation.

One of the most troublesome problems confronting the manufacturer of gauges arises in connection with the shipping of the completed and adjusted gauges to the user. The essential element of commercial pressure gauges is the so-called "Bourdon tube" which consists of a thin walled metallic tube of flattened cross section bent to form an arc of greater or lesser length and having one of its ends closed while the other is open to the pressure fluid whose pressure is to be measured. This tube is supported solely at such open end, the movements of the closed end under variations in pressure being transmitted through suitable multiplying mechanism to a needle traveling over a dial. The susceptibility of this tube to shocks is such that notwithstanding the accurate adjustment and careful packing of the gauge prior to shipment, the gauge almost never arrives at its destination with the needle standing at the proper position on the dial, the shocks and vibrations received during transit having imparted a permanent set to the Bourdon tube such as to throw the gauge entirely out of adjustment. Elaborate and costly methods of packing gauges for shipment have accordingly been devised, as well as mechanical devices for preventing injurious displacement of the gauge parts during transportation thereof, but so far as is known none of such expedients has proven entirely satisfactory. As the result of a long series of tests and experiments, however, it has been discovered that if the free extremity of the Bourdon tube be so guided as to permit of its unimpeded movement, within limits, in the path along which it tends to move under variations in pressure of the pressure fluid, while at the same time it is restrained against any substantial movement in a direction transverse of such path, the gauge may be conveyed to its point of destination without experiencing any appreciable injury or change in adjustment, even though no unusual care be exercised in the packing or transportation of the gauge. This result appears in part at least to be due to the fact that the inertia of the needle and gauge movement parts is such as to damp undue and sudden movement of the end of the tube along its normal path of movement, and it is thus permissible to allow the tube to have freedom of movement along this path without fear of distortion of the tube by shocks or blows acting in the direction of such path.

The principal object of the invention is accordingly, in general, to provide a device applicable to gauges of usual construction and by the employment of which the safe arrival of the finished and adjusted gauge at its point of destination may be assured, and in particular, to provide simple and reliable means for so guiding the free extremity of the Bourdon tube as to permit freedom of motion thereof along its normal path of movement while restraining it against substantial movement in directions transverse of such path.

A further object is to provide means such as just referred to of a character permitting of the necessary accuracy in operation without incurring undue expense in manufacture or installation.

Other objects will be in part obvious and in part will appear hereinafter.

In the accompanying drawings there is shown by way of illustration one arrangement of parts suitable for carrying the above objects into effect, and in such drawings,—

Figure 2:
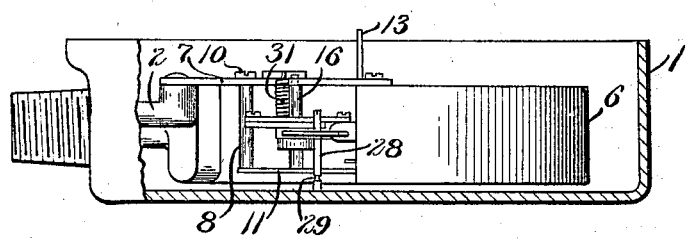

Fig. 1 is a front elevation of a gauge device showing the dial plate as broken away to disclose the interior mechanism; and Fig. 2 is a cross section through the casing of the gauge showing the interior mechanism in side elevation, the gauge being shown as resting on its back in horizontal position.

Referring to the drawings, the gauge casing is indicated at 1. Within this casing is arranged the movement supporting frame 2, having the threaded nipple 3 which projects outwardly through an opening in the side wall of the casing. This frame may be secured in position by means of screws 4, and is provided with a chamber communicating with a bore in the nipple 3. This frame serves to support the end 5 of a Bourdon tube 6, the interior of which communicates with the chamber in the frame. Secured to the front face of the frame is a supporting plate 7 from which project posts such as 8, secured to the frame by means of screws 9, 10. These posts serve to support a second plate 11, arranged parallel to the plate 7 and behind the same. Journalled in suitable openings in the plates 7 and 11 is an arbor 13 having a pinion 14 secured thereon at a point intermediate the plates. Said arbor projects forwardly from the plate 7 and is adapted to have a pointer 15 secured thereon. A second arbor 16 is also journalled in the plates 7 and 11, such arbor having secured thereto a sector lever 17 having the gear teeth 18 which mesh with the pinion 14. To the opposite extremity of this sector lever, a link 19 is pivotally secured, as by means of the screw 20, the opposite end of said link being pivotally connected by a screw 21 to a bracket arm 22 projecting from the closed end of the Bourdon tube. The gauge is provided with a dial plate 23 having graduations 24 thereon with which the pointer 15 operates. The parts as above described are substantially like those as commonly employed in commercial pressure gauges.

In accordance with the present invention, means are provided for confining the movement of the end of the tube to the pathway it traverses during the normal operation of the tube and there is preferably provided means for confining the amplitude of such movement to such portion of the pathway as is normally traversed by the gauge, so that the tube is prevented from exceeding the limit of movement of a normal operation. As illustrated, a plate 25 is secured to the bracket 22 by means of a flexible neck 26. This plate is provided with a slot 27 which is elongate substantially in the path of movement of the plate 25 under pressure variations to which the Bourdon tube may be subjected, such slot if desired being curved to conform closely to such path. Secured in the rear wall of the casing is a pin 28 which projects upwardly and through the slot 27 in the plate 25. This pin is of a diameter but slightly less than the width of the slot and this serves to prevent any substantial movement of the plate 25 transversely of the normal path of movement which it traverses under pressure variations in the Bourdon tube. If desired, this pin 28 may be provided with a notch or groove 29 so that the position of its upper end may be adjusted by bending the pin at the grooved portion thereof. The position of the plate 25 may also be adjusted slightly by bending the neck 26 upon which it is secured.

As herein shown a screw 30 engages an opening in the supporting plate 7, such screw being provided with a depending coil spring 31, such spring extending across the path of movement of the sector lever 17 and serving as a buffer to resiliently oppose excessive movement of such lever member.

With the parts as thus arranged, the normal operation of the Bourdon tube and the associated links and levers is not interfered with, as the usual movements of the free end of the tube are permitted by reason of the elongation of the slot 27 in the direction of such movement. If during transportation of the gauge, it is subjected to shocks or blows which tend to cause the free end of the tube to move in the usual path along which it travels under pressure variation, the inertia of the sector lever and the pointer is sufficient to damp such movement to such an extent that the tube suffers no permanent or injurious deformation. If, however, during transportation of the gauge, the casing is subjected to shocks such as would tend to move the free end of the tube in a direction transverse to that imparted thereto by pressure variations, such movement is prevented by the engagement of the pin 28 with the side walls of the slot.

The resilient buffer 31 also serves to prevent overthrow of the lever member 17, if for any reason the gauge should be subjected to excessive pressures.

While a specific arrangement of parts for producing the desired restriction in movement of the end of the Bourdon tube as herein disclosed, it is evident that other and equivalent means might well be substituted therefor without departure from the spirit of the present invention.

What I claim and desire to secure by Letters Patent of the United States is:

1. A gauge comprising a casing, a Bourdon tube therein, an element secured to the free end portion of said tube, and an element fixed relatively to the casing, one of said elements having an elongate slot extending substantially parallel to the path of movement of the free end of the tube end under pressure variation, and the other of said elements projecting into said slot.

2. A gauge comprising a Bourdon tube, an element carried by said tube adjacent to its free extremity, such element having an elongate slot therein extending substantially in the direction of the path of movement of such extremity under variation in pressure in the tube, and a fixed pin projecting through the slot, said pin being of a diameter slightly less than the width of the slot.

3. A gauge comprising a casing, a Bourdon tube therein, a member secured to the tube adjacent to its free extremity, said member having an elongate slot substantially conforming to the path of movement of such member with the end of the tube under variation in fluid pressure, and a pin fixedly secured to the casing and projecting into the slot.

4. A gauge comprising a Bourdon tube, a member fixedly secured to the free extremity of the tube, said member having an elongate slot therein, and a fixed pin engaging said slot, the said member having a relatively flexible portion intermediate the tube and the slot whereby the slotted portion of the member may be adjusted relatively to that portion thereof which is secured to the tube.

5. A gauge comprising a casing, a Bourdon tube therein, a slotted member fixedly secured to the free extremity of said tube, and a pin fixedly secured in the casing and engaging said slot, said pin having a portion of reduced diameter intermediate said slotted member and the point of connection of the pin to the casing.

Signed by me at Bridgeport, Connecticut, this 20th day of February, 1922.

OTTO W. HEISE.